United States Patent [19]

Bednarz

[11] Patent Number: 4,852,403

[45] Date of Patent: Aug. 1, 1989

[54] WATER METER LOCK

[76] Inventor: James W. Bednarz, 1025 West Crosby, Slaton, Tex. 79364

[21] Appl. No.: 40,922

[22] Filed: Apr. 21, 1987

[51] Int. Cl.$^4$ ............................................. G01F 15/18
[52] U.S. Cl. ........................................ 73/201; 73/273; 285/80
[58] Field of Search .................... 73/273, 201, '272 R; 285/80, 81, 39; 411/910, 372, 373, 374, 629; 220/284

[56] References Cited

U.S. PATENT DOCUMENTS

| | | | |
|---|---|---|---|
| 716,204 | 12/1902 | Waldo | 70/232 |
| 725,290 | 4/1903 | Speer | 70/178 |
| 850,457 | 4/1907 | Anderson | 73/203 |
| 932,162 | 8/1909 | Morris | 285/80 |
| 1,473,751 | 11/1923 | Walker | 285/80 |
| 1,808,969 | 6/1931 | Porter | 285/80 |
| 1,835,924 | 12/1931 | Bartholomay | 73/201 |
| 1,887,999 | 11/1932 | Fow | 73/201 |
| 1,973,658 | 9/1934 | Redding | 285/30 |
| 3,355,945 | 12/1967 | Perry | 73/201 |
| 3,913,400 | 10/1975 | Floren | 73/273 |
| 4,253,509 | 3/1981 | Collet | 411/214 |
| 4,473,169 | 9/1984 | Fitzgerald | 220/284 |

Primary Examiner—Herbert Goldstein
Attorney, Agent, or Firm—Wendell Coffee

[57] ABSTRACT

A water meter is locked into its housing to prevent tampering by placing a cover over a hexagon nut and a hand nut. Relative rotation between the hexagon nut and the hand nut is necessary to remove the meter from the housing. The cover has a wrench which fits the hexagon nut and prevents relative rotation between the hexagon nut and the cover. The cover has a boss which engages the hand nut and prevents relative rotation between the case and the hand nut. The cover has legs which engage the housing to prevent relative rotation between the cover and the housing.

10 Claims, 2 Drawing Sheets

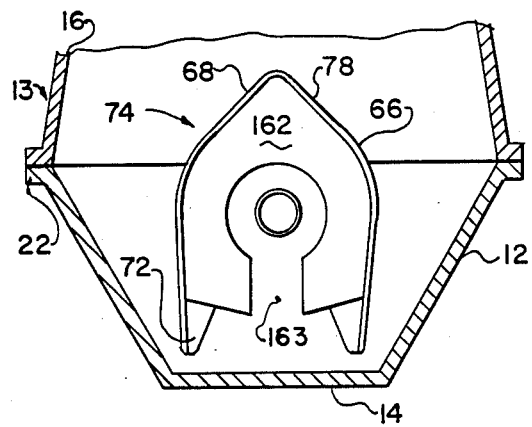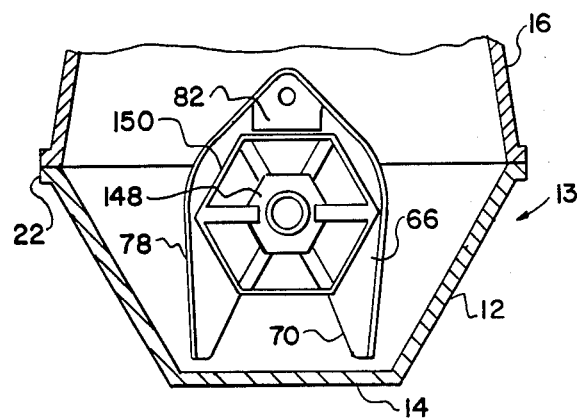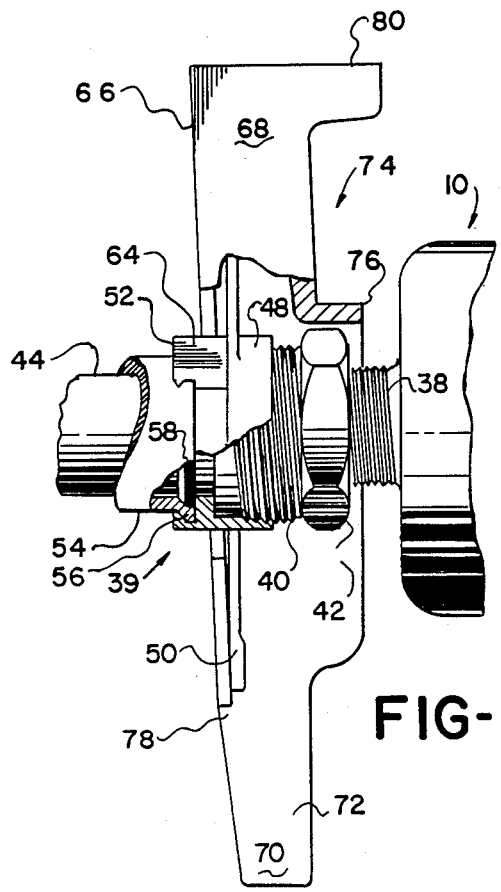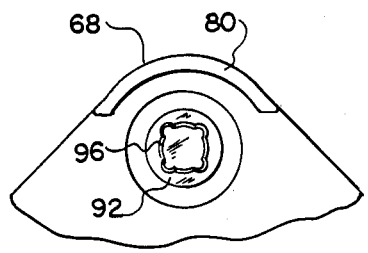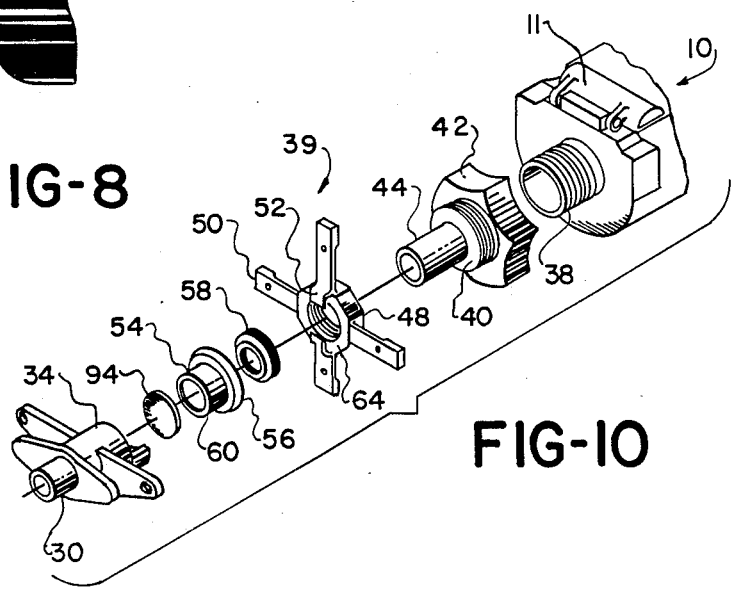

WATER METER LOCK

BACKGROUND OF THE INVENTION (1) Field of the Invention

This invention relates to pipe couplings with a lock thereon connected to a fluid meter in a housing. Applicant believes this application to be in the field of piping or plumbing. Therefore, this application is written so that a pipe fitter would be able to make and use the invention.

(2) Description of the Related Art

Before this application was filed, the applicant was aware of the following United States patents:

| Inventor | U.S. Pat. No. |
| --- | --- |
| SPEER | 725,290 |
| WALKER | 1,473,751 |
| PORTER | 1,808,969 |
| REDDING | 1,973,658 |
| PERRY | 3,355,945 |
| COLLET | 4,253,509 |

Also, there has been developed certain bolts with heads which have smooth circular circumferences of hardened steels. However, the radial face of the bolt heads include indentations of a particular pattern. Therefore, a key wrench particular pattern projecting from the face of the key wrench can be used to engage the pattern on the head of the bolt to attach and detach the bolt. One of the common uses of bolts of this nature are for lug bolts for decorative automobile wheels.

Meters, such as water meters, are often buried underground. The water main, for example, runs past several houses, and the meter is connected onto an inlet pipe extending from the water main. The outlet end of the meter is connected to a pipe extending to the house for domestic use. In many areas these meters are encased in housings. A small opening in the top of the housing is of sufficient size so that the meter can be removed and replaced for maintenance purposes. However, in certain situations, persons will remove the meter for the purpose of tampering with the meter so that the meter displays on its dial, less fluid such as water, than was actually used. Also, in certain instances, the locks o the water meters are insufficient when it is desired to turn off the water and lock it in the "off" position to any particular house.

SUMMARY OF THE INVENTION (1) Progressive Contribution to the Art

I have invented a locked cover particularly adapted for attaching to water meters which are buried in a housing underground. The cover encloses a hexagon nut and a hand nut that connects the meter into the housing. A wrench on a cover engages the hexagon nut so there can be no relative movement between the cover and the hexagon nut. A boss on the inside portion of the cover engages the hand nut so there can be no relative rotation between the hand nut and the cover.

The cover has legs thereon so that the legs engage the housing so there can be no relative rotation between the cover and the housing. Therefore, it may be seen that neither of the nuts can be rotated. The cover is held into place by a special bolt, as described above, so that only those having the key wrench can remove the cover from over the nuts. Flanges are provided on the cover so that an unauthorized person cannot get a prizing tool between the parts of the cover to prize the parts apart.

It will be understood that if the owner of the meter can prevent people from tampering with the meter, the meter should reflect the correct amount of fluid delivered. Basically, if they can prevent the meter from being removed from the housing, they can prevent tampering of the meter.

In addition in some cases, they decide to turn off the water to a house and lock it so that no fluid will pass through the meter. It will be understood that with the locked cover described above, that the locked cover can be removed and the connections opened and a blind flange or blind washer be placed in connections to the meter. Then the meter is reinstalled with the locked cover as described. The locked cover will again prevent removal of the meter, which will thereby prevent removal of the blind flange.

(2) Objects of this Invention

An object of this invention is to prevent tampering of meters.

Further objects are to achieve the above with devices that are sturdy, compact, durable, lightweight, simple, safe, efficient, versatile, long life, ecologically compatible, energy conserving, and reliable, yet inexpensive and easy to manufacture, connect, and maintain.

Other objects are to achieve the above with a method that is rapid, versatile, ecologically compatible, energy conserving, efficient, and inexpensive, and does not require skilled people to connect, and maintain.

The specific nature of the invention, as well as other objects, uses, and advantages thereof, will clearly appear from the following description and from the accompanying drawing, the different views of which are not scale drawings.

BRIEF DESCRIPTION OF THE DRAWING

FIG. 6 is a sectional view similar to FIG. 3 showing the invention with a hexagon hand wheel.

FIG. 7 is a sectional view similar to FIG. 5 showing a second embodiment of the back plate.

FIG. 8 is a side elevational view of the invention similar to FIG. 4 with the piping, and specifically the hexagon nut and hand wheel, in place.

FIG. 9 is an elevational view of the head of the bolt.

FIG. 10 is an exploded perspective view of the embodiments of FIGS. 2 and 3.

Figure 1:
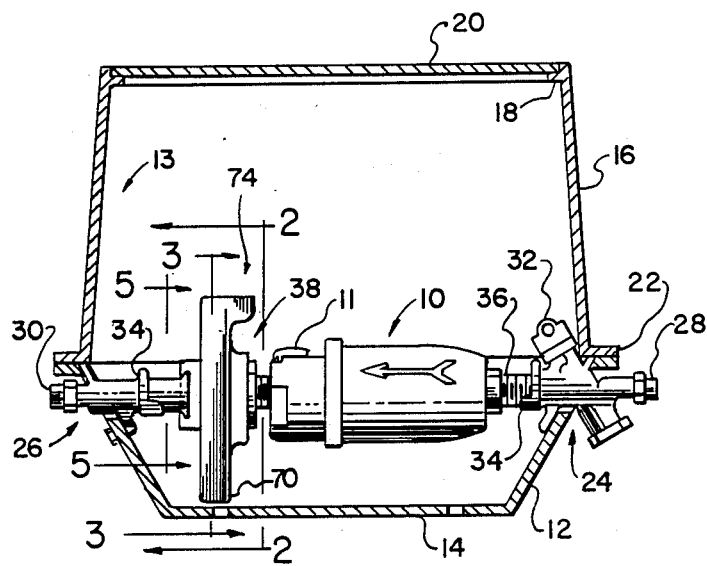
FIG. 1 is a side elevational view of the meter with the invention with the housing thereof shown in section

As an aid to correlating the terms of the claims to the exemplary drawing, the following catalog of elements and steps is provided:

10 meter
11 dial
12 lower portion
13 housing
14 bottom
16 upper portion
18 top 20 lid
22 flange
24 inlet end
26 outlet end
28 inlet pipe
30 outlet pipe
32 valve
34 butt compression join
36 meter inlet end
38 meter outlet end
39 expansion joint
40 threaded bushing
42 hexagon nut
44 tube
48 hand nut
50 four star hand wheel
52 ears
54 butt bushing
56 flange
58 rubber gasket
60 downstream end
62 back plate
64 downstream portion
66 case
68 bight end
70 open end
72 legs
74 guard cover
76 wrench
78 flange
80 peak
82 boss
84 bolt hole
86 threaded bolt hole
88 bolt
90 small boss
92 head
94 blank washer
96 indention
98 key wrench
148, hand nut
150 hexagon hand wheel
162 back plate
163 slot

DESCRIPTION OF THE PREFERRED EMBODIMENT

Referring to the drawing there may be seen a water meter 10 in housing 13. The housing has two portions, lower portion 12 having bottom 14 and upper portion 16. Top 18 of upper portion 16 of housing 13 has an opening therein. Lid 20 fits said opening and may be held in place by a regular key lock, as is well know, but not shown for clarity in the drawing. Water meter 10 will include a dial 11 which may be seen from the opening in the top 18 when the lid 20 is removed. The lower part of the top portion 16 and the top of the lower portion 12 have flange 22 by which the two parts may be bolted together. Also, the meter housing itself will have inlet end 24 and outlet end 26.

Inlet pipe 28 is structurally connected to inlet end 24 of housing 13, and outlet pipe 30 is structurally connected to outlet end 26 of housing 13. It will be understood that the inlet pipe 28 might be connected to a water main supplying water under pressure, and the outlet pipe 30 might be connected to domestic piping for the customer to be served.

Inlet pipe 28 has integral therewith stop and drain valve 32.

Butt compression joint 34 is formed on the inside of the housing of both the inlet pipe 28 and the outlet pipe 30. Therefore, it may be seen that both the inlet and outlet pipes terminate in the housing with the butt compression joint. The meter inlet end 36 correlatively mates the butt compression joint 34 to form a fluid tight seal at this point when it is tightly pressed against it.

The meter outlet end 38 includes expansion joint 39 (FIGS. 8 and 10). The expansion joint includes bushing 40 which has internal and external threads. The internal threads mate with and are fluidly connected to the external threads of meter outlet end 38. The bushing also includes hexagon nut 42. The downstream end of the bushing is in the form of tube 44 with a beveled end. Hand nut 48 is threaded to the external threads of bushing 40. Thus, the hand nut 48 and the hexagon nut 42 are adjacent to one another. Hand nut 48 has four star hand wheel 50 thereon. Also, hand nut 48 on the downstream side has two ears 52 which engage butt bushing 54. The upstream end of butt bushing 54 has an outwardly extending circumferential flange 56 which fits within the ears 52. The internal portion of the flange 56 is beveled to receive rubber gasket 58. The rubber gasket makes a fluid tight seal between the internal bevel of flange 56 and the smooth exterior cylindrical surface of tube 44.

Downstream end 60 of the butt bushing fits against butt compression joint 34 to form a fluid tight seal at that point. Therefore, it may be seen that when the hand nut 48 is rotated upon the threaded bushing 40 to move the hand nut away from the meter 10, that it will cause the ends of the water meter to be compressed tightly within the butt compression joints 34 to hold the meter in place. Also, the compressional force of the butt bushing 54 will compress the gasket as may be seen. If hand nut 48 is rotated to move the nut toward meter 10. The ears 52 will pull the butt bushing 54 away from butt compression join 34, meter 10 to be removed.

Those having ordinary skill in the meter arts will recognize the above description of the meter and its fitting, including the hand nut and hexagon nut, within the lower portion 12 of the housing 13 is old, well known, and commercially available on the market. Also, as pointed out above, there exist a problem of some people tampering with such a meter so that the meter dial 11 does not reflect an accurate statement as to the amount of water used.

According to this invention, with the meter 10 removed, shaped back plate 62 is placed over the downstream portion 64 on the hand nut 48. The back plate 62 also could be described as a plate with a hole in the middle. Then the meter is placed within lower portion 12 of housing 13. The hand nut 48 is rotated to tightly jam the meter 10 in the housing 13. "U" shaped case 66 is placed upon the expansion joint straddling hexagon nut 42 of threaded bushing 40. "U" shaped case 66 has bight end 68 and open end 70. The open end will have two legs 72. The case is so proportioned that legs 72 of the open end 70 are adjacent to housing bottom 14 so the case cannot be rotated around the axis of expansion joint 39. The back plate 62 and case 66 form guard cover 74 over hexagon nut 42 and hand nut 48.

Figure 2:
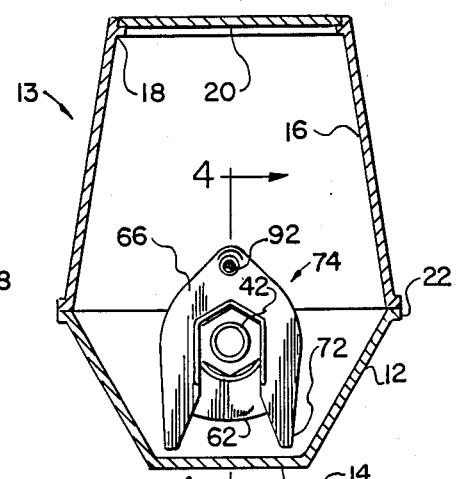
FIG. 2 is a sectional view taken substantially on line 2—2 of FIG. 1 showing a first embodiment of the invention.

The meter side of case 66 at the bight 68 is in the form of wrench 76. The wrench operationally fits hexagon nut 42. The case 66 cannot be rotated because legs 72 of the open end are so close to bottom 14, then the hexagon nut 42 cannot be rotated because of wrench 76 fitting snugly over hexagon nut 42 (FIG. 2).

The case 66 has flange 78 extending downstream around its periphery. Back plate 62 fits snugly within this flange. The flange prevents a tool from being inserted between the back plate and the case to pry the cover 74 open.

Figure 3:
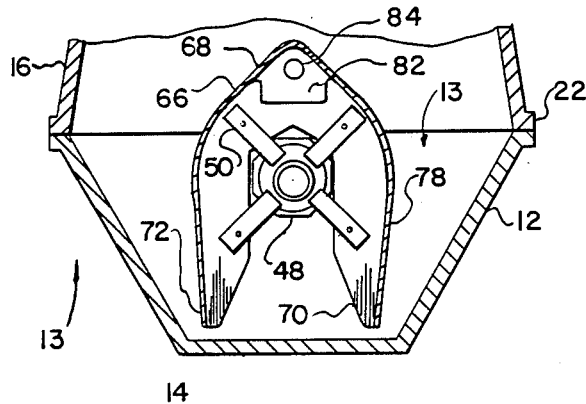
FIG. 3 is a sectional view taken on line 3—3 of FIG. 1 with a four star hand wheel.
Figure 5:
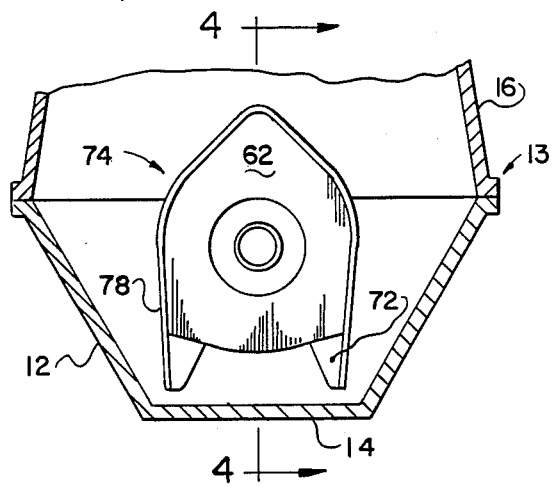
FIG. 5 is a view similar to FIG. 3 taken substantially on line 5—5 of FIG. 1.
Figure 4:
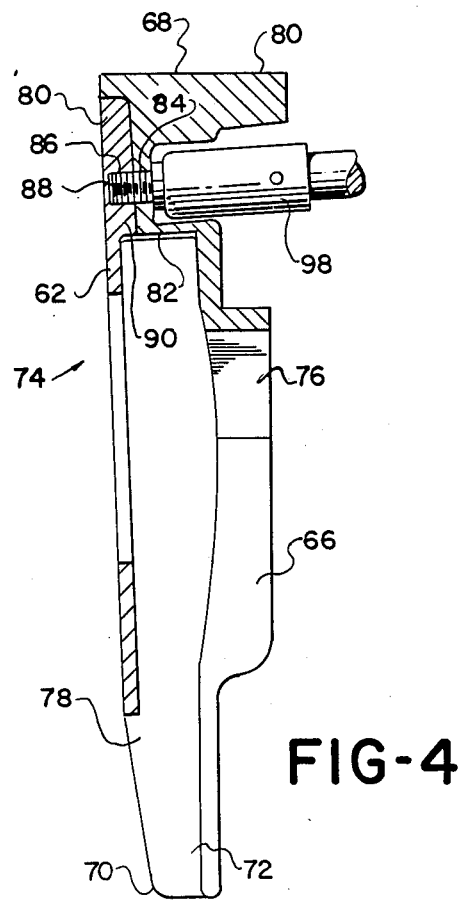
FIG. 4 is a sectional view taken substantially on line 4—4 of FIGS. 2 and 5, without the piping present.

Peak 80 is formed on the top of the case and the top of the back plate. Boss 82 is formed at the peak upon case 66. Bolt hole 84 is formed in the case. Threaded bolt hole 86 is formed in the back plate coaxial with bolt hole 84. Bolt 88 extends through bolt hole 84 and threads into threaded bolt hole 86 to tightly clamp case 66 to back plate 62, thus forming cover 74 to enclose the two nuts 42 and 48. It will be noted that hand nut 48 cannot be rotated because four star hand wheel 50 fits operationally against the bottom of boss 82 which projects securely against back boss 90 which is around threaded bolt hole 86 on the back plate (FIGS. 3 and 4).

Therefore, it may be seen that with the cover installed, not only are both of the nuts covered, but neither of the nuts can be rotated even if there were some way to find access to the nut. Hexagon nut 42 cannot be rotated because of wrench 76, and hand nut 48 cannot be rotated because of bosses 82 and 90.

Bolt 88 has special head 92 (FIG. 9). The head 92 is a combination lock bolt head which has an annular indentation 96 in the radial face of it which is of peculiar shape. Otherwise, the circumferential surface of head 92 of bolt 88 is smooth and cylindrical.

Therefore the bolt can be removed only by using a special combination key wrench 98 which fits the particular indentations 96 of head 92.

In addition to this, I prefer that the threads upon bolt 88 and threaded bolt hole 86 be left handed threads. Therefore, anyone who might otherwise attempt to loosen the nut would be tightening the nut rather than loosening the same unless he were familiar with this fact. In addition, I prefer to apply a microencapsulated lack of air anaerobic adhesive to bolt 88. Such adhesives are well known and commercially available on the market and may be applied to the bolt at the time of manufacture and has a long shelf life. However, as soon as the bolt is used the microencapsulations are broken, allowing the adhesive to harden, which will lock the bolt 88 in place within a short time after its initial installation. Therefore, a torque of about 10% greater than was used to tighten bolt 88 is required to loosen the bolt, which further prevents tampering.

It will also be understood that guard cover 74 may be used in the event it is desired to turn off the water or cut off the water to any meter. The meter can be removed and blank washer 94 placed at butt joint 34 (FIG. 10). Once this is done and guard cover 74 is locked in place, as described above, the water will not flow through the meter unless the cover 74 is unlocked as described above and blank washer 94 removed.

Bosses 82 and 90 upon case 66 and back plate 52 are thicker at the outer periphery than they are towards the center. Therefore, when bolt 88 is tightened, it will tend to pull the lower portions of the back plate and case together to tightly clamp them together.

FIGS. 7 and 8 illustrate a modified form of the back plate, which is identified as back plate 162. In this illustration, the otherwise tore shaped back plate has radial slot 163 cut therein so that the back plate may be radially placed on the expansion join.

In this way, it may be seen that the guard cover 74 could be placed over the nuts locking the meter in place without the removal of meter 10 from housing 13.

Also, some of the meters will have hexagon hand wheel 50 mounted upon the hand nut designated in FIG. 6 as hand nut 48. If a hexagon hand wheel 150 is used instead of a star hand wheel 50, the hand nut will still be locked in place by guard cover 74 inasmuch as boss 82 will engage hexagon nut 150 to prevent the rotation thereof.

The embodiments shown and described above are only exemplary. I do not claim to have invented all the parts, elements or steps described. Various modifications can be made in the construction, material, arrangement, and operation, and still be within the scope of my invention.

The restrictive description and drawing of the specific examples above do not point out what an infringement of this patent would be, but are to enable one skilled in the art to make and use the invention. The limits of the invention and the bounds of the patent protection are measured by and defined in the following claims.

I claim as my invention:

1. The method of locking a meter in a fluid system, said fluid system including:
   a. a stationary meter housing having two ends,
   b. a bottom, and
   c. a top, encasing
   d. a fluid meter,
   e. an opening in the top of the meter housing,
   f. an inlet pipe structurally connected to one end of the housing,
   g. an outlet pipe structurally connected to the other end of the housing,
   h. said fluid meter connected between the outlet pipe and inlet pipe,
   i. a hexagon nut and a hand nut adjacent to one another on the connection of the meter to the one of the pipes structurally connected to the housing,
   ii. said meter housing enclosing the meter and the hexagon nut and the hand nut;
   Wherein the improved process comprises:
   j. locking a cover over the hexagon nut and hand nut,
   k. engaging the cover with the hexagon nut, thereby
   l. preventing relative rotation between the hexagon nut and the cover,
   m. engaging the cover with the and nut, thereby
   n. preventing relative rotation between the hand nut and the cover, and
   o. engaging the cover with the housing, thereby
   p. preventing relative rotation between the cover and the housing.

2. In a fluid system including
   a. a stationary meter housing having two ends,
   b. a bottom, and
   c. a top, encasing
   d. a fluid meter,
   e. an opening in the top of the meter housing,
   f. an inlet pipe struturally connected to one end of the housing,
   g. an outlet pipe structurally connected to the other end of the housing,
   h. said fluid meter connected between the outlet pipe and inlet pipe,
   i. a hexagon nut and a hand nut on the connection of the meter to the one of the pipes structurally connected to the housing;

The improved structure comprising:
j. a cover connected over said hexagon nut and said hand nut,
k. a wrench on the cover engaged with the hexagon nut to prevent relative rotational movement between the hexagon nut and the cover,
l. a boss in the cover engaging said hand nut to prevent relative rotational movement of the hand nut and the cover, and
m. legs on the cover engaging engaging said housing to prevent relative rotation between the cover and the housing.

3. In a fluid system including
a. a stationary meter housing having two ends, a bottom, and a top encasing
b. a fluid meter,
c. an opening in the top of the meter housing,
d. an inlet pipe structurally connected to one end of the housing,
e. an outlet pipe structurally connected to the other end of the housing,
f. the pipes terminating in the housing with butt compression joints to fit the meter,
g. an outlet end of the meter having an expansion joint thereon,
h. a hexagon nut and a hand nut on the expansion joint; so arranged and constructed that relative rotation between the two nuts tightly jam the meter to said butt joints thus making structural connections and making fluid tight fits and forming a fluid connection from the inlet pipe through the meter to the outlet pipe;

The improved structure comprising:
i. a tore shaped back plate encircling the expansion joint,
j. a "U" shaped case having a bight end and an open end straddling the expansion joint,
k. said back plate and case forming a guard cover which fits over both of said nuts,
l. legs on the open end of the case adjacent to the housing bottom forming means for preventing rotation of said cover about said expansion joint,
m. wrench means on said guard cover for engaging said hexagon nut,
n. a bolt extending through the case into the back plate thereby tightly clamping them together, and
o. a head on said bolt requiring a key wrench to fit said head.

4. The invention as defined in claim 3 further comprising:
p. a flange along the perimeter of the case,
q. said back plate closely fitted within said flange.

5. The invention as defined in claim 3 further comprising:
p. a radial slot in the back plate tore so that the back plate may be radially placed on the expansion joint.

6. The invention as defined in claim 3 further comprising:
p. a boss on said case and
q. a boss on said back plate,
r. said bosses being means for engaging said hand nut.

7. The invention as defined in claim 6 further comprising:
s. said bosses thicker at the top,
t. said bolt extends through the case boss and is threaded into a hole in the back plate boss so that the cover is tightly clamped together.

8. The invention as defined in claim 7 further comprising:
u. a flange along the perimeter of the case,
v. said back plate snugly fit within said flange.

9. The invention as defined in claim 8 further comprising:
w. a radial slot in the back plate tore so that the back plate may be radially placed on the expansion joint.

10. In a fluid system including:
a. an inlet pipe and an outlet pipe, and
b. a fluid meter connected between the inlet pipe and outlet pipe by
c. at least one nut:

The improved structure comprising:
d. cover means engaging said nut for preventing rotation of said nut, and
e. a bolt securing said cover means in place,
f. a head on said bolt having:
  i. smooth circular circumferences, and
  ii. a radial face having an annular indentation of a particular pattern, and
g. the bolt head being cylindrical.

* * * * *